United States Patent [19]
Uchiyama et al.

[11] Patent Number: 5,798,776
[45] Date of Patent: Aug. 25, 1998

[54] COLOR INK JET RECORDING METHOD

[75] Inventors: Yaeko Uchiyama, deceased, late of Nagano-ken, by Kazuhiro Uchiyama; Hiroko Hayashi; Masaaki Itano, both of Nagano-ken, all of Japan

[73] Assignee: Seiko Epson Corporation, Tokyo, Japan

[21] Appl. No.: 869,412

[22] Filed: Jun. 4, 1997

Related U.S. Application Data

[63] Continuation of Ser. No. 381,487, Jan. 31, 1995, abandoned, which is a continuation-in-part of Ser. No. 307,051, Sep. 16, 1994, abandoned.

[51] Int. Cl.$^6$ .................................. B41J 2/21; G01D 11/00
[52] U.S. Cl. .................................. 347/43; 347/100
[58] Field of Search .................................. 347/43, 15, 100; 358/529

[56] References Cited

U.S. PATENT DOCUMENTS

| | | | |
|---|---|---|---|
| 4,631,548 | 12/1986 | Milbrandt | 347/15 |
| 4,953,015 | 8/1990 | Hayasaki et al. | 358/529 |
| 5,168,552 | 12/1992 | Vaughn et al. | 347/43 |
| 5,315,382 | 5/1994 | Tanioka | 358/523 |
| 5,371,531 | 12/1994 | Rezanka et al. | 347/100 |
| 5,401,303 | 3/1995 | Stoffel et al. | 347/100 |
| 5,428,377 | 6/1995 | Stoffel et al. | 347/15 |
| 5,455,610 | 10/1995 | Harrington | 347/43 |
| 5,488,398 | 1/1996 | Matsubara et al. | 347/43 |

FOREIGN PATENT DOCUMENTS

| | | |
|---|---|---|
| 0580449 | 1/1994 | European Pat. Off. . |
| 0596373 | 5/1994 | European Pat. Off. . |
| 0608429 | 8/1994 | European Pat. Off. . |
| 06-024006 | 2/1994 | Japan . |
| 6143617 | 5/1994 | Japan . |

*Primary Examiner*—Benjamin R. Fuller
*Assistant Examiner*—Thinh Nguyen
*Attorney, Agent, or Firm*—Wenderoth, Lind & Ponack, L.L.P.

[57] ABSTRACT

A color ink jet recording method is disclosed which can provide a high-quality monochrome print, does not cause bleeding derived from intermixing of a black ink with color inks and can equalize the dot diameter of four color ink dots, offer a high drying rate and provide a sharp and vivid color image. The color ink jet recording method includes a step of forming a dot unit of a black ink consisting of plural of ink droplets, wherein color inks having a surface tension of less than 40 dyn/cm at 20° C. and black ink having a surface tension of not less than 40 dyn/cm are used.

15 Claims, 6 Drawing Sheets

◪ BLACK INK ALONE

○ COLOR INK ALONE

COLOR INK JET RECORDING METHOD

This application is a continuation of now abandoned Ser. No. 08/381,487 filed Jan. 31, 1995, which is a continuation-in-part of now abandoned Ser. No. 08/307,051 filed Sep. 16, 1994.

BACKGROUND OF THE INVENTION

1. Technical Field

The present invention relates to a color ink jet recording method.

2. Background Art

Color printing is generally performed by using color inks of yellow, magenta and cyan and superimposing the colors on one another. In the ink jet printing, this nature of the color ink printing sometimes raises problems, for example color-to-color intermixing of inks and flow of a color ink into adjacent color inks.

In order to solve these problems, Japanese Patent Laid-Open No. 197778/1985 discloses a method in which color inks having a same surface tension (30–60 dyn/cm at 20° C.) are used. According to disclosure of this publication, the use of inks having a same surface tension equalizes the time taken for each color ink to fix to a recording material as well as the degree of feathering. The publication discloses that the color image formed by the inks can withstand the degradation. As far as the present inventors know, however, this recording method cannot sufficiently reduce the bleeding in the record. Further, the degradation of the image cannot be prevented satisfactorily. Moreover, this recording method is disadvantageous also in that a black print formed by the black ink with a monochrome printer is inferior in quality.

Furthermore, Japanese Patent Laid-Open No. 4117/1991 proposes a recording method in which a water-base color ink having a surface tension in the range of from 30 to 40 dyn/cm is first printed and then a water-base color ink having a surface tension in the range of from 45 to 73 dyn/cm is printed. According to disclosure of this publication, it is possible to prevent a color ink from flowing into adjacent color inks. Moreover, high resolution letters which are practically used for documents can be provided without staining of a paper feed roller caused by insufficient drying of the inks. However, the combination of the black ink and the color inks having different surface tensions in the method may produce a difference in the size of ink dots on recording paper. In order to equalize the dot sizes, the amount of the black ink used may be larger than that of the other color inks. The large amount of the black ink may cause the delay in drying of the print and the degradation of an image due to the flow of an ink into adjacent inks, bleeding and other unfavorable phenomena.

SUMMARY OF THE INVENTION

Accordingly, an object of the present invention is to provide a color ink jet recording method which can make the dot diameter of a black ink equal to the dot diameters of other color inks without causing image quality degradation, such as feathering and insufficient drying.

Another object of the present invention is to provide an ink jet recording method which can prevent bleeding derived from color-to-color intermixing caused by the flow of a black ink into other color inks and vice versa.

Another object of the present invention is to provide an ink jet recording method which can provide a sharp and vivid color image.

We have now found that these problems can be solved by forming a black dot unit with plural black ink droplets in which the black ink has a surface tension of not less than 40 dyn/cm.

Specifically, the present invention provides a color ink jet recording method using a color ink and black ink, comprising the step of printing plural black ink droplets to form a black dot unit, wherein color inks having a surface tension of less than 40 dyn/cm at 20° C. and a black ink having a surface tension of not less than 40 dyn/cm are used.

The color ink jet recording method of the present invention is further characterized in that one black dot unit consists of 2 to 4 black ink droplets.

The present invention also provides a preferred method of the above color ink jet in which when a black image is adjacent to a color image, the method further comprises the step of printing the color ink as an undercoat on positions of some black dots in the whole region or a partial region of the black image. This method will be hereinafter referred to as "the first color mixing method."

The present invention further provides a preferred method of the above color ink jet in which, when a black image is adjacent to a color image, further comprising the steps of suspending the printing step of some black dots in the whole or a partial region of the black image and printing the color ink on the print suspended dots. This method will be hereinafter referred to as "the second color mixing method."

The color ink jet recording method according to the present invention can offer the following advantageous results:

All the four inks, i.e., a black ink and other color inks of yellow, magenta and cyan, can have an identical dot diameter on recording paper, enabling a sharp and vivid color image free from bleeding of the ink at the time of color mixing and feathering to be formed.

The drying rate of the black ink becomes as high as the other color inks, improving the printing speed and, also, reducing the staining of records after printing.

Monochrome recording having a high quality can be provided on plain paper.

Further, the formation of one black dot unit with plural black ink droplets at a position adjacent to color inks can prevent bleeding derived from color-to-color inter-mixing caused by the flow of an ink of a dot into adjacent ink dots.

BRIEF DESCRIPTION OF THE DRAWINGS

FIG. 6 is an explanatory view of a further embodiment of the present invention, the first color mixing method. In this embodiment, when a black image is adjacent to a color image, color dots are first printed on some dots where the black dots are to be printed, and then black dots are printed on the color dots previously printed. The black dot consists of plural ink droplets. FIGS. 6(a), (b) and (c) show the prints in which ⅓, ½ and ⅔ of black dots are superimposed on color dots previously printed, respectively.

FIG. 7 is an explanatory view of a further embodiment of the present invention, the second color mixing method. In this method, when a black image is adjacent to a color image, in the black image some black dots are thinned out, and then the color ink is printed on the thinned dots. Specifically, some black dots are replaced with color dots. FIGS. 7(a), (b) and (c) show the prints in which ¼, ⅖ and ⅗ of black dots are replaced with color dots, respectively.

FIG. 8 is an explanatory view of a further embodiment of the color ink jet recording method according to the present invention. Referring to the drawing, the square in the center is a color image region, and capital letters "A" and bars around the color image region are black image regions. In this embodiment, when a black image is located apart from the color image at a distance not exceeding 5-dot width, the first or second color mixing method is applied to the whole region or the partial region which has 10-dot width from the border of the black image facing the color image. On the other hand, when a black image is located apart from the color image at a distance exceeding 5-dot width, the black image is formed by a black ink alone.

DETAILED DESCRIPTION OF THE INVENTION

In the method of the present invention, the color inks may be single colors of yellow, magenta and cyan or alternatively may be red, green and blue. The color inks to be used may be determined by taking the print density of the black ink and hue into consideration.

The color ink jet recording method according to the present invention will now be described in detail with reference to FIG. 1.

Figure 1:
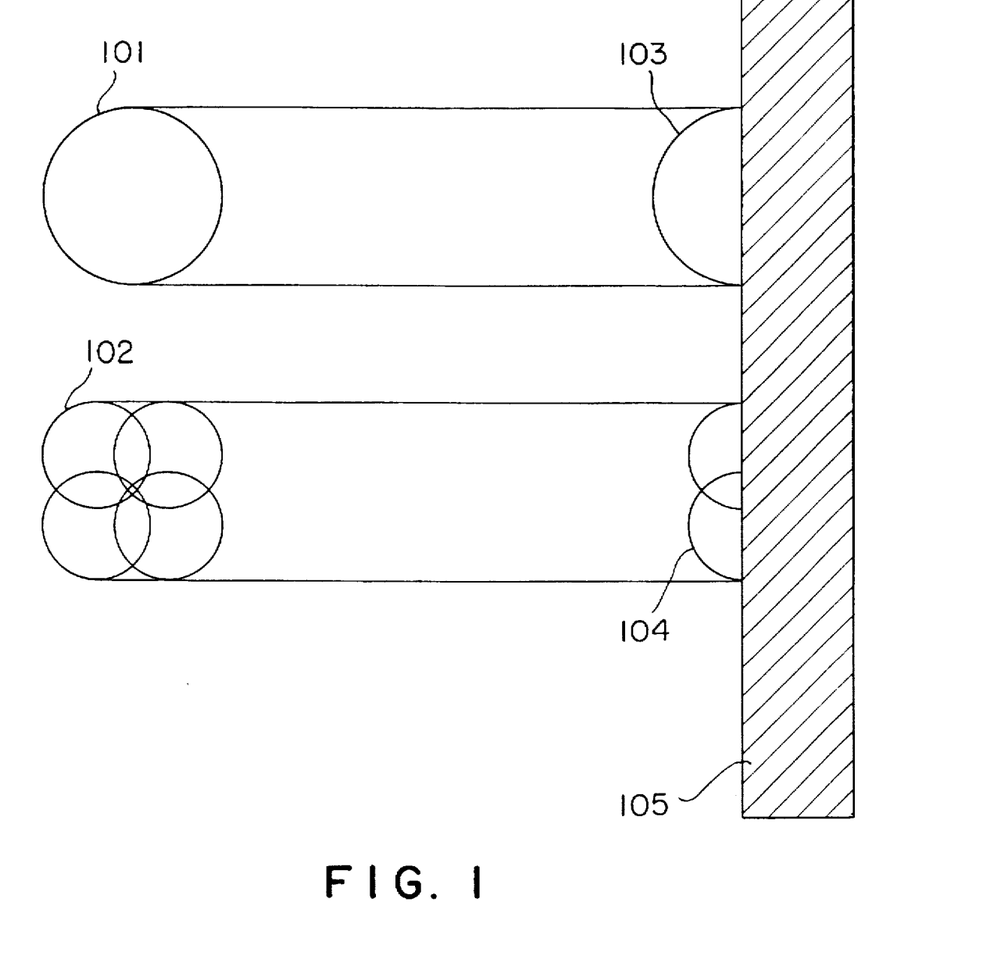
FIG. 1 is an explanatory view of one dot unit of a black ink printed by the color ink jet recording method according to the present invention. Referring to the drawing, numeral 101 designates one dot of a color ink as viewed from the top, numeral 102 black ink droplets constituting one dot unit as viewed from the top, numeral 103 one dot unit of a color ink on recording paper as viewed from the side, numeral 104 black ink droplets constituting one dot unit on recording paper as viewed from the side, and numeral 105 recording paper.

In the color ink jet recording method of the present invention, as shown in FIG. 1, one black dot unit consists of an assembly of plural ink droplets 102, while one color dot unit 101 consists of one color ink droplet. The black ink droplets 102 on recording paper are thinner and more homogeneous than a dot formed by one ink droplet. As the results, the drying rate can be increased, and further feathering can be prevented. Therefore, the print quality is improved.

The number of black ink droplets which constitute one black dot unit may be determined depending upon the weight of the ink and the spread of the ink droplet on a recording medium. It also varies depending upon recording devices, such as the responsibility of a recording head and timing of paper feed. However, the number of ink droplets which constitute one black dot unit is preferably 2 to 4 from the practical viewpoint.

Figure 2:
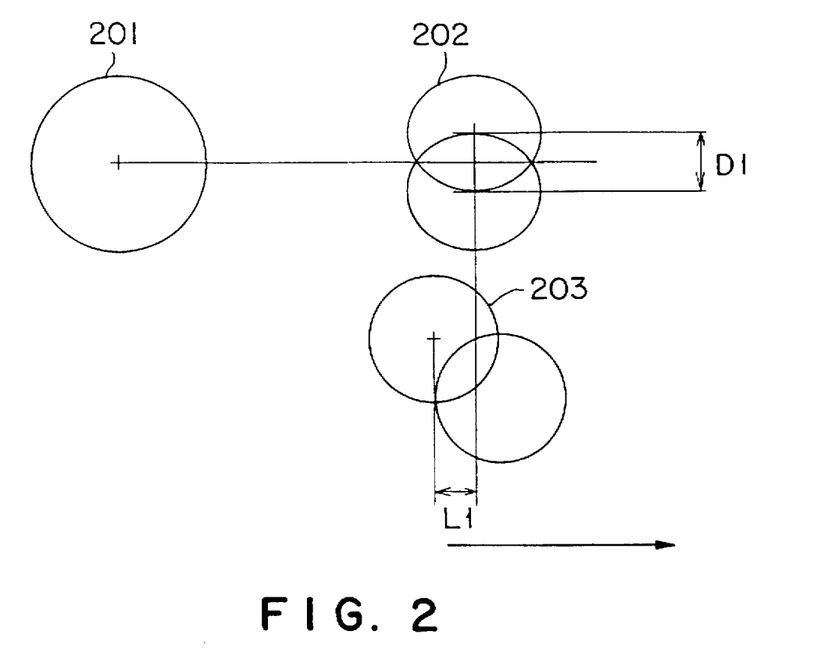
FIG. 2 is an explanatory view of an embodiment of the color ink jet recording method according to the present invention in which one black dot unit consists of two ink droplets. The drawing also shows another embodiment in which the starting position of the black ink printing is shifted. Referring to the drawing, an arrow indicates a main scanning direction. Numeral 201 designates one dot of a color ink as viewed from the top. Two black ink droplets 202 which constitute one black dot unit are printed with deviation D1 that is in the paper-carriage direction. Two black ink droplets 203 which constitute one black dot unit are printed with deviation L1 that is in the main scanning direction.

A method for ejecting plural black ink droplets through an identical nozzle using, for example, a serial head of 360 dpi will now be described with reference to FIG. 2. As shown in FIG. 2, the number of ink droplets constituting one black dot unit is 2. The color ink is printed by one droplet (201) at ⅟₃₆₀ dot pitch with one passage of the printing head. The black ink is printed by two droplets (202) with two passages of the printing head. In this embodiment, two black ink droplets are printed with deviation D1 that is in the paper-carriage direction (in the drawing, perpendicular direction). It is also preferred to form black ink droplets with deviation L1 that is in the main scanning direction, like ink droplets 203. The deviation may be formed by, for example, shifting the position where printing is started or by delaying the timing of printing. This method enables the size of the color ink dot and that of the black ink dot to be made closer to each other.

Figure 3:
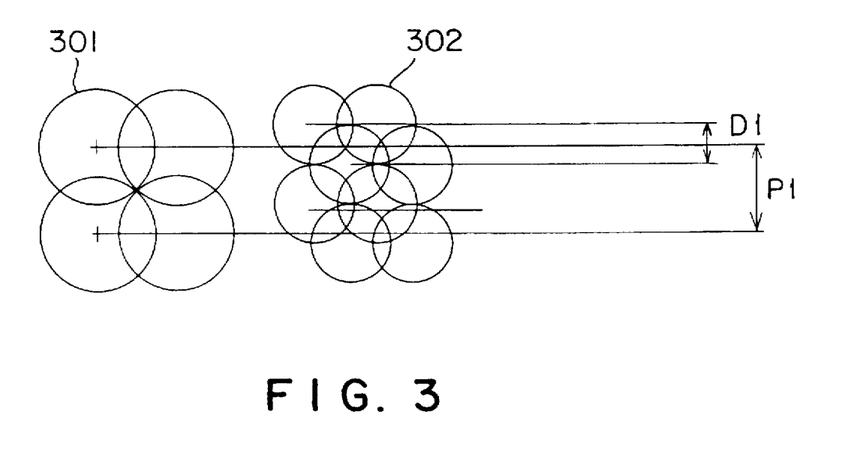
FIG. 3 is an explanatory view of another embodiment of the color ink jet recording method according to the present invention in which one black dot unit consists of two ink droplets. Referring to the drawing, numeral 301 designates four color dots. Black ink droplets 302 are printed with deviation D1 to constitute black dot units.

FIG. 3 shows an embodiment in which one black dot unit consists of two black ink droplets. In this embodiment, the dot units including the black dot and the color dot are formed with deviation P1 that is in the paper-carriage direction (in the drawing, perpendicular direction). While one color dot unit consists of one color ink droplet 302, one black dot unit consists of two black ink droplets 301. In this embodiment, the two black ink droplets are printed with deviation D1 that is in the paper-carriage direction and a certain deviation that is in the main scanning direction.

Figure 4:
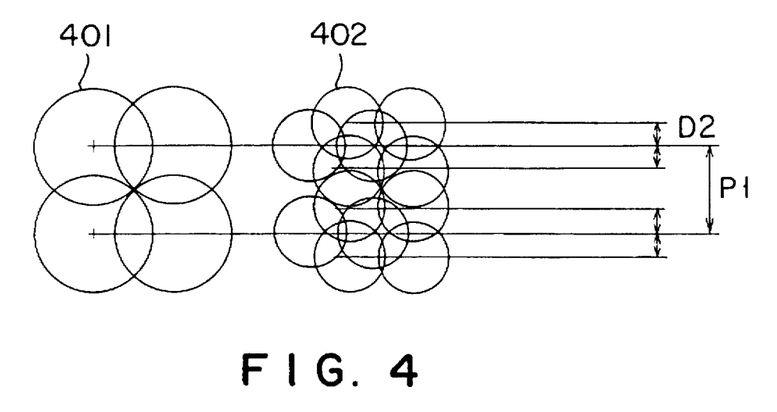
FIG. 4 is an explanatory view of a further embodiment of the color ink jet recording method according to the present invention in which one black dot unit consists of three ink droplets. Referring to the drawing, numeral 401 designates four color dots. Black ink droplets 402 are printed with deviation D2 to constitute black dot units.

FIG. 4 shows an embodiment wherein one black dot unit consists of three black ink droplets, while one color dot unit consists of one color ink droplet. In this embodiment, three series of black ink droplets are printed with three passages of the printing head. Specifically, after the first series is printed, the second series is printed apart from the first series at a distance of deviation D2 that is in the paper-carriage direction. Further, the third series is printed apart from the second series at the distance of deviation D2.

Figure 5:
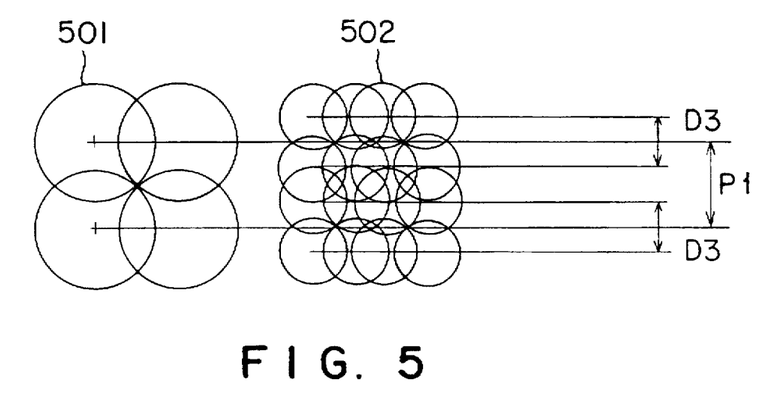
FIG. 5 is an explanatory view of a further embodiment of the color ink jet recording method according to the present invention wherein one black dot unit consists of four ink droplets. Referring to the drawing, numeral 501 designates four color dots. Black ink droplets 502 are printed with deviation D3 to constitute black dot units.

FIG. 5 shows an embodiment in which one black dot unit consists of four black ink droplets, while one color dot unit consists of one color ink droplet. In this embodiment, two series of black ink droplets are formed with two passages of the printing head. Specifically, after the first series is printed, the second series is printed apart from the first series at a distance of deviation D3 that is in the paper-carriage direction. Furthermore, in this embodiment, when a series of black ink droplets is printed, the response frequency of the printing head is doubled compared with that for printing the color ink.

According to another preferred embodiment of the present invention, the printing head having multiple nozzles for ejecting black ink may be used. By means of the printing head, plural black ink droplets which form one black dot unit are printed with one passage of the printing head. This printing head may not reduce the printing speed.

According to another aspect of the present invention. i.e.. the first color mixing method. when a black image is adjacent to a color image. it is preferred to print the color ink as an undercoat on positions of some black dots. Then at the position. the black dot consisting of plural black ink droplets is printed.

This method can more effectively prevent bleeding derived from color-to-color intermixing caused by the flow of a dot ink into adjacent dots and the flow of an ink in an image region into adjacent image regions.

This method may be applied to a partial region of a black image adjacent to the color image. This region may be herein referred to as a "color mixing region." According to the preferred embodiment of the present invention. the color mixing region is not exceeding 10-dot width. more preferably 5-dot width. from the border of the black image facing the color image. Alternatively. the whole region of the black image may be the color mixing region. According to the preferred embodiment of the present invention. in both cases. the ratio of the black dots under which the color ink is printed is 10 to 100% to the total number of the black dots in the color mixing region.

Figure 6:
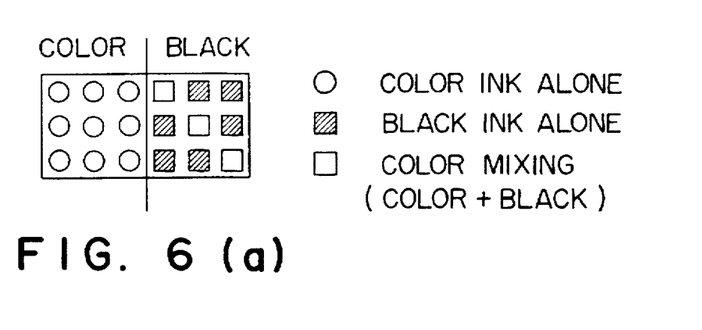

The first color mixing method is specifically described in FIG. 6. Referring to FIG. 6(a). ⅓ of black dots are superimposed on color dots previously printed. Further. FIGS. 6(b) and (c) show ½ and ⅔ of black dots are superimposed on color dots previously printed. respectively.

According to another aspect of the present invention. i.e.. the second color mixing method. when a black image is adjacent to a color image. it is also preferred to suspend the printing step of some black dots in the whole region or a partial region of the black image to thin out some black dots. and then to print the color ink on the print suspended dots. Specifically. some black dots are replaced with color dots. In this method. the black dot unit also consists of plural black ink droplets. According to the preferred embodiment of the present invention. in the second color mixing method. the black image is formed by first printing the color ink and then printing the black ink on the place where the color ink is not printed.

This method can more effectively prevent bleeding derived from color-to-color intermixing caused by the flow of a dot ink into adjacent dots and the flow of an ink in an image region into adjacent image regions. The partial region of a black image may be herein referred to as a "color mixing region." According to the preferred embodiment of the present invention. the color mixing region is not exceeding 10-dot width. more preferably 5-dot width. from the border of the black image facing the color image. According to the preferred embodiment of the present invention. the ratio of the black dots which are thinned out is 10 to 80% to the total number of dots in the color mixing region.

Figure 7:
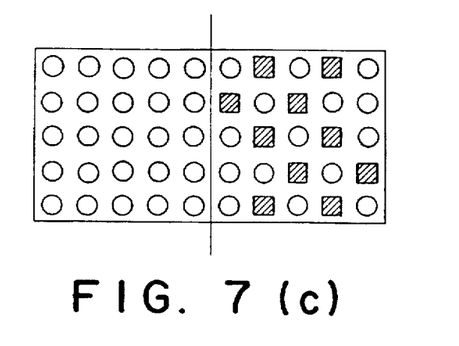

The second color mixing method is specifically described in FIG. 7. Referring to FIG. 7(a). ¼ of black dots are replaced with color dots. Further. FIGS. 7(b) and (c) show ⅖ and ⅗ of black dots are replaced with color dots. respectively.

In first and second color mixing methods of the present invention. the term "adjacent to" refers to not only the case where a black image is adjacent to a color image without any empty dot. but the case where a black image is located apart from a color image at a distance of a certain space. for example. 10 or 5 empty dots. This space may be set on account of a variation in the dot spread which depends upon. for example. the paper feed accuracy and the paper quality. The space ensures a good image quality. When the image has the space between the color image and the black image. the first and second color mixing methods may be applied and effectively prevent bleeding derived from color-to-color intermixing in this case.

Figure 8:
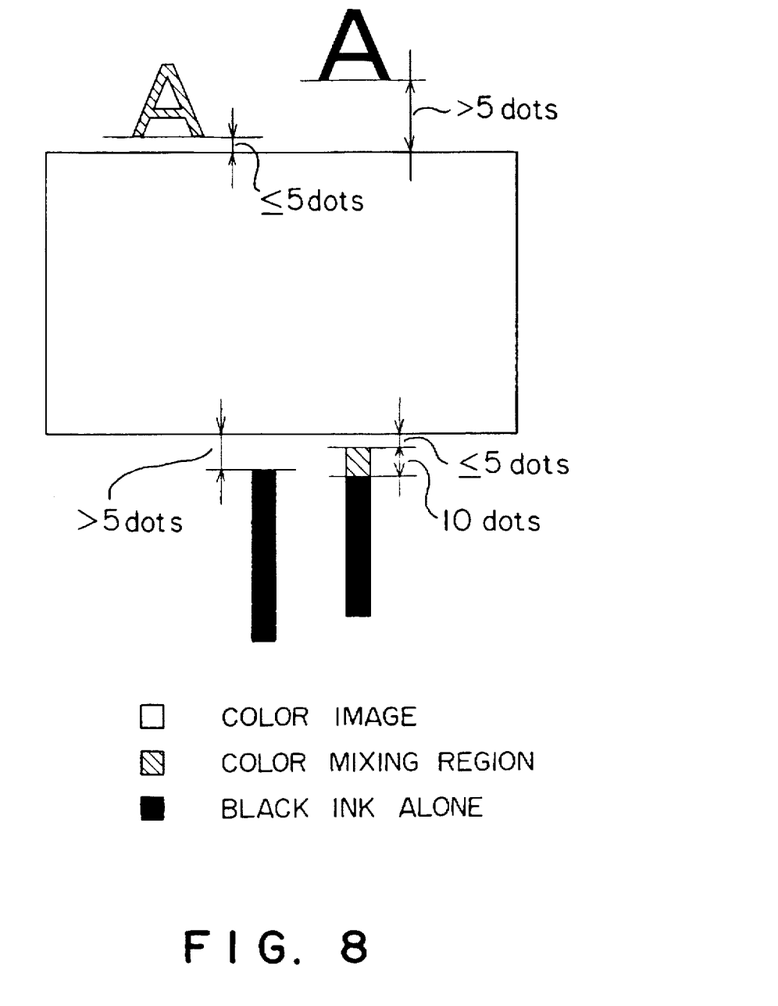

This embodiment of the present invention is specifically described in FIG. 8. Referring to the drawing. the capital letter "A" and the bar which are located from the color image at distance exceeding 5-dot width are printed by the black ink alone. On the other hand. the capital letter "A" and the bar which are located from the color image at a distance not exceeding 5-dot width are formed according to the first or second color mixing method of the present invention. With respect to the capital letter "A." the whole region is formed according to the first or second color mixing method. With respect to the bar the first or second color mixing method is applied to the region which has 10-dot width from the border of the black image facing the color image.

The yellow. magenta. cyan and black inks used in the color ink jet recording method according to the present invention each comprise a colorant. such as a dye or a pigment. water and/or various organic solvents and various additives suitable for contemplated purposes.

Colorants for the inks may be water-soluble dyes used in the conventional ink jet recording inks. and specific examples thereof include:

C.I. Direct Red 2, 4, 9, 23, 26, 31, 39, 62, 63, 72, 75, 76, 79, 80, 81, 83, 84, 89, 92, 95, 111, 173, 184, 207, 211, 212, 214, 218, 221, 223, 224, 225, 226, 227, 232, 233, 240, 241, 242, 243 and 247;

C.I. Direct Violet 7, 9, 47, 48, 51, 66, 90, 93, 94, 95, 98, 100 and 101;

C.I. Direct Yellow 8, 9, 11, 12, 27, 28, 29, 33, 35, 39, 41, 44, 50, 53, 58, 59, 68, 86, 87, 93, 95, 96, 98, 100, 106, 108, 109, 110, 130, 132, 142, 144, 161 and 163;

C.I. Direct Blue 1, 10, 15, 22, 25, 55, 67, 68, 71, 76, 77, 78, 80, 84, 86, 87, 90, 98, 106, 108, 109, 151, 156, 158, 159, 160, 168, 189, 192, 193, 194, 199, 200, 201, 202, 203, 207, 211, 213, 214, 218, 225, 229, 236, 237, 244, 248, 249, 251, 252, 264, 270, 280, 288, 289 and 291;

C.I. Direct Black 9, 17, 19, 22, 32, 51, 56, 62, 69, 77, 80, 91, 94, 97, 108, 112, 113, 114, 117, 118, 121, 122, 125, 132, 146, 154, 166, 168, 173 and 199;

C.I. Acid Red 35, 42, 52, 57, 62, 80, 82, 111, 114, 118, 119, 127, 128, 131, 143, 151, 154, 158, 249, 254, 257, 261, 263, 266, 289, 299, 301, 305, 336, 337, 361, 396 and 397;

C.I. Acid Violet 5, 34, 43, 47, 48, 90, 103 and 126;

C.I. Acid Yellow 17, 19, 23, 25, 39, 40, 42, 44, 49, 50, 61, 64, 76, 79, 110, 127, 135, 143, 151, 159, 169, 174, 190, 195, 196, 197, 199, 218, 219, 222 and 227;

C.I. Acid Blue 9, 25, 40, 41, 62, 72, 76, 78, 80, 82, 92, 106, 112, 113, 120, 127 : 1, 129, 138, 143, 175, 181, 205, 207, 220, 221, 230, 232, 247, 258, 260, 264, 271, 277, 278, 279, 280, 288, 290 and 326;

C.I. Acid Black 7, 24, 29, 48, 52 : 1 and 172;

C.I. Reactive Red 3, 13, 17, 19, 21, 22, 23, 24, 29, 35, 37, 40, 41, 43, 45, 49 and 55;

C.I. Reactive Violet 1, 3, 4, 5, 6, 7, 8, 9, 16, 17, 22, 23, 24, 26, 27, 33 and 34;

C.I. Reactive Yellow 2, 3, 13, 14, 15, 17, 18, 23, 24, 25, 26, 27, 29, 35, 37, 41 and 42;

C.I. Reactive Blue 2, 3, 5, 8, 10, 13, 14, 15, 17, 18, 19, 21, 25, 26, 27, 28, 29 and 38;

C.I. Reactive Black 4, 5, 8, 14, 21, 23, 26, 31, 32 and 34;

C.I. Basic Red 12, 13, 14, 15, 18, 22, 23, 24, 25, 27, 29, 35, 36, 38, 39, 45 and 46;

C.I. Basic Violet 1, 2, 3, 7, 10, 15, 16, 20, 21, 25, 27, 28, 35, 37, 39, 40 and 48;

C.I. Basic Yellow 1, 2, 4, 11, 13, 14, 15, 19, 21, 23, 24, 25, 28, 29, 32, 36, 39 and 40;

C.I. Basic Blue 1, 3, 5, 7, 9, 22, 26, 41, 45, 46, 47, 54, 57, 60, 62, 65, 66, 69 and 71; and C.I. Basic Black 8.

Inorganic pigments (carbon black), organic pigments (insoluble azo pigments, soluble azo pigments, phthalocyanine pigments, isoindolinone pigments, quinacridone pigments and perinone and perylene pigments) and the like may be used as the pigment. Further, besides the above pigments, treated pigments having a surface treated with a resin or the like (such as graft carbon) may also be used.

The content of these colorants in the ink composition is preferably in the range of from 1 to 10% by weight on a solid basis from the viewpoint of print density of records, clogging, and delivery properties and the like.

In the ink jet recording ink according to the present invention, water-soluble organic solvents, besides ion-exchanged water, may be used as a solvent. Examples of the water-soluble organic solvent include alkyl alcohols and ethers having 1 to 4 carbon atoms, such as methyl alcohol, ethyl alcohol, n-propyl alcohol, isopropyl alcohol, n-butyl alcohol, sec-butyl alcohol, tert-butyl alcohol and isobutyl alcohol; amides, such as dimethylformamide and dimethylacetamide; ketones or keto alcohols, such as acetone and diacetone alcohol; ethers, such as tetrahydrofuran and dioxane; polyalkylene glycols, such as polyethylene glycol and polypropylene glycol; alkylene glycols having an alkylene group with 2 to 6 carbon atoms, such as ethylene glycol, propylene glycol, 1,2,6-hexanetriol, thiodiglycol and hexylene glycol; glycerin; and lower alkyl ethers of polyhydric alcohols, such as ethylene glycol methyl ether, diethylene glycol monomethyl (or ethyl) ether and triethylene glycol monomethyl (or ethyl) ether.

Among these water-soluble organic solvents, polyhydric alcohols are preferred because they are very effective as a drying retarder for preventing a failure of delivery derived from clogging of nozzles caused by such an unfavorable phenomena that water contained in an ink jet recording ink evaporates to cause precipitation of a recording agent.

In the color ink jet recording method according to the present invention, for example, monohydric alcohols, such as ethyl alcohol and n-propyl alcohol, in addition to the above water-soluble organic solvents, which can serve as a wetting agent, are preferred as the water-soluble organic solvent. They can prevent the recording ink from excessively penetrating or diffusing into recording paper, thereby preventing feathering, which is effective for realizing a high print quality enough to enable the ink to be used with plain paper.

The water-soluble organic solvents may be used alone or in the form of a mixture of two or more.

Further, surfactants, such as acetylene glycol, may be added to inks of three colors, i.e., yellow, magenta and cyan, used in the color ink jet method of the present invention, to adjust the surface tension of the inks to less than 40 dyn/cm. The amount of these surfactants added as the surface tension modifier is preferably in the range of from 0.1 to 2% by weight from the viewpoint of preventing unfavorable phenomena, such as occurrence of satellite and foaming, at the time of delivery of the inks.

Furthermore, the recording ink used in the color ink jet recording method according to the present invention may, if necessary, contain the conventional dispersants, surfactants, viscosity modifiers, surface tension modifiers, specific resistance modifiers, pH adjustors, antioxidants, mildewproofing agents, chelating agents and the like.

The contents of these various additives in the ink composition may vary depending upon purposes. Since, however, the use of the additives in an excessive amount is causative of the occurrence of foaming, precipitation and deterioration in storage stability, the additives are preferably used in an amount in the range of from 0.001 to 5% by weight.

EXAMPLES

The color ink jet recording method according to the present invention will now be described in more detail with reference to the following examples and comparative examples, though it is not limited to these examples only.

Ink compositions listed in the following table were prepared according to a conventional method.

TABLE 1

| Ink (wt. %) | | 1 | | | | 2 | | | |
| --- | --- | --- | --- | --- | --- | --- | --- | --- | --- |
| | Materials | Black | Yellow | Magenta | Cyan | Black | Yellow | Magenta | Cyan |
| Colorant | Direct black 19 | 2.0 | | | | | | | |
| | Acid yellow 23 | | 3.0 | | | | | | |
| | Acid red 52 | | | 3.0 | | | | | |
| | Acid blue 9 | | | | 3.0 | | | | |
| | Direct black 154 | | | | | 2.0 | | | |
| | Direct yellow 86 | | | | | | 3.0 | | |
| | Direct red 227 | | | | | | | 3.0 | |
| | Direct blue 199 | | | | | | | | 3.0 |
| Solvent | Glycerin | 4.0 | 10.0 | 10.0 | 10.0 | 4.0 | 20.0 | 20.0 | 20.0 |
| | Polyethylene glycol #200 | | 10.0 | 10.0 | 10.0 | | | | |
| | Ethanol | 5.0 | | | | | | | |
| | n-Propanol | | | | | 3.0 | | | |
| Additives | Surfynol TG | | 0.4 | 0.4 | 0.4 | | | | |
| | Surfynol 82 | | 2.0 | 2.0 | 2.0 | | | | |
| | Surfynol 440 | | | | | | 1 | 1 | 1 |
| | Proxel XL-2 | 0.3 | 0.3 | 0.3 | 0.3 | 0.3 | 0.3 | 0.3 | 0.3 |
| Solvent | Ion-exchanged water | 88.7 | 74.3 | 74.3 | 74.3 | 90.7 | 75.7 | 75.7 | 75.7 |
| Surface tension (dyn/cm) at 20° C. | | 57.3 | 31.2 | 30.4 | 29.7 | 45.6 | 37.8 | 35.9 | 36.5 |

TABLE 2

| Ink (wt. %) | | 3 | | | | 4 | | |
|---|---|---|---|---|---|---|---|---|
| | Materials | Black | Yellow | Magenta | Cyan | Black | Yellow | Magenta | Cyan |
| Color-ant | Food black 2 | 2.0 | | | | | | | |
| | Acid yellow 23 | | 3.0 | | | | | | |
| | Acid red 289 | | | 3.0 | | | | | |
| | Acid blue 9 | | | | 3.0 | | | | |
| | Direct black 154 | | | | | 2.0 | | | |
| | Direct yellow 132 | | | | | | 3.0 | | |
| | Acid red 249 | | | | | | | 3.0 | |
| | Direct blue 199 | | | | | | | | 3.0 |
| Sol-vent | Diethylene glycol | | 10.0 | 10.0 | 10.0 | 2.0 | 10.0 | 10.0 | 10.0 |
| | Glycerin | 3.0 | | | | 4.0 | 10.0 | 10.0 | 10.0 |
| | 2-Pyrrolidone | 3.0 | | | | | | | |
| | TEGmBE* | | 10.0 | 10.0 | 10.0 | | | | |
| | Ethanol | 4.0 | | | | | | | |
| | 1-Propanol | | | | | 3.0 | | | |
| Addi-tives | Surfynol TG | | | | | | 0.8 | 0.8 | 0.8 |
| | Surfynol 82 | | | | | | 4.0 | 4.0 | 4.0 |
| | Surfynol 440 | | 1.0 | 1.0 | 1.0 | | | | |
| | Proxel XL-2 | 0.3 | 0.3 | 0.3 | 0.3 | 0.3 | 0.3 | 0.3 | 0.3 |
| Sol-vent | Ion-exchanged water | 87.7 | 75.7 | 76.7 | 76.7 | 88.7 | 72.9 | 71.9 | 71.9 |
| | Surface tension (dyn/cm) at 20° C. | 53.4 | 31.4 | 33.7 | 33.5 | 49.7 | 30.8 | 31.3 | 30.5 |

*TEGmBE: Triethylene glycol mono-butyl ether

The following color ink jet recording was carried out using the ink compositions listed in Table 1 to evaluate the print quality.

A 360-dpi on-demand ink jet recording device provided with 48 nozzles, which is an experimental model manufactured by our company, was used as an ink jet recording device.

Test 1: Bleeding due to color intermixing of black ink with yellow ink

A yellow ink was printed at 100% duty on commercially available PPC paper (XEROX-P manufactured by Fuji Xerox Co., Ltd.), and letters were printed thereon using a black ink. The print sample was evaluated by observation with the naked eye on bleeding derived from intermixing of the black region with the yellow region. The evaluation criteria were as follows.

For Comparative Examples 1 to 3, the black ink was printed in such a manner that one dot of the ink consisted of one black ink droplet.

Deteriorated image due to remarkable bleeding . . . X

Significant bleeding . . . Δ

Slight bleeding having no influence on the whole image . . . ○

No significant bleeding . . . ⊙

Test 2: Drying rate of prints

A print sample provided in the same manner as described above in Test 1 was allowed to stand for a certain period.

PPC paper, which is of the same type as the recording paper, was put on the print sample and pressed for one sec. The time taken for the print to cause no offset on the recording paper was measured. Further, the drying rate was evaluated in terms of the time taken for the whole print sample to cause no offset on the recording paper. The evaluation criteria were as follows.

Not less than 1 min . . . X 30 sec to 1 min . . . Δ

5 to 30 sec . . . ○

Less than 5 sec . . . ⊙

Test 3: Homogeneity of ink dots

Print samples were provided by printing respective colors of yellow, magenta, cyan and black on commercially available PPC paper (XEROX-P manufactured by Fuji Xerox Co., Ltd.) as recording paper. The spread of ink dots was measured by a projector. Further, the homogeneity of the ink dots was evaluated by comparing the size of the black ink dot with that of the color ink dot.

The size difference between the black dot and the color dot was:

within ±10% . . . ○ within ±20% . . . Δ over ±20% . . . X

The results are given in Table 3.

TABLE 3

| | Combi-nation of inks | Weight of color ink per dot (μg) | Total weight of black ink per dot (μg) | Weight and number of ink droplets of black ink per dot | Test 1 | Test 2 | Test 3 |
|---|---|---|---|---|---|---|---|
| Ex. 1 | 2 | 0.06 | 0.06 | 0.03 μg × 2 | ○ | ⊙ | ○ |
| Ex. 2 | 2 | 0.06 | 0.06 | 0.02 μg × 3 | ⊙ | ⊙ | ○ |
| Ex. 3 | 1 | 0.06 | 0.12 | 0.04 μg × 3 | ⊙ | ○ | ○ |
| Ex. 4 | 1 | 0.06 | 0.12 | 0.03 μg × 4 | ⊙ | ○ | ○ |

TABLE 3-continued

|  | Combination of inks | Weight of color ink per dot (µg) | Total weight of black ink per dot (µg) | Weight and number of ink droplets of black ink per dot | Test 1 | Test 2 | Test 3 |
| --- | --- | --- | --- | --- | --- | --- | --- |
| Ex. 5 | 2 | 0.09 | 0.08 | 0.02 µg × 4 | ○ | ○ | ○ |
| Comp. Ex. 1 | 2 | 0.06 | 0.06 | 0.06 µg × 1 | △ | ○ | x |
| Comp. Ex. 2 | 1 | 0.06 | 0.12 | 0.12 µg × 1 | x | x | ○ |
| Comp. Ex. 3 | 2 | 0.09 | 0.08 | 0.08 µg × 1 | △ | △ | x |

When the formation of dots having identical diameters using a color ink and a black ink different from each other in surface tension are contemplated, it is necessary to use the black ink having a higher surface tension in a larger ink weight than the color ink having a lower surface tension. However, the formation of a black dot using a plurality of ink dots, even when like Examples 1, 2 and 5 the dot weight of the black ink is equal to or smaller than that of the color ink, makes the dot diameter of the black ink closer to that of the color ink as compared with Comparative Examples 1 and 3, thereby enabling bleeding derived from color-to-color intermixing to be prevented.

Further, even when like Examples 3 and 4 the total ink weight of one dot unit is larger than that of the color ink, the formation of a black dot using plural ink dots enables the ink to be applied on recording paper more thinly and more homogeneously. Moreover, the drying rate becomes higher as compared with Example 2. As the result, as with Examples 1, 2 and 5, bleeding derived from color-to-color intermixing can be prevented.

Thus, when a black dot unit consists of a plural of ink droplets per dot of a color ink, the ink can be applied thin and homogeneously on recording paper, which can reduce the required ink weight of the black ink, prevent bleeding derived from color-color intermixing and improve the drying rate of the color image.

Test 4: Color Mixing

The color print was conducted with the combination of the ink compositions shown in Table 2 on commercially available PPC paper (XEROX-P manufactured by Fuji Xerox Co., Ltd.). The amount of inks per dot and number of ink droplets consisting of a black dot were as shown in Table 4. When a black image was formed adjacent to a color image, color ink was printed on the positions of some black dots in the whole region of the black image. The ratio of the black dots under which the color ink was printed to the total number of the black dots in the color mixing region was as shown in Table 4. The bleeding of the print sample was evaluated in the same manner as described in Test 1. The results are given in Table 4.

Test 5: Drying rate of prints

The drying rates of the prints provided in the same manner as described in Test 4 were measured in the same manner as described in Test 2. The results are given in Table 4.

Test 6: Homogeneity of ink dots

The homogeneity of ink dots formed by the inks shown in Table 2, with the amount of inks per dot and number of ink droplets consisting of a black dot as shown in Table 5, were evaluated in the same manner as described in Test 3. The results are given in Table 4.

TABLE 4

|  | Combination of inks | Weight of color ink per dot (µg) | Total weight of black ink per dot (µg) | Weight and number of ink droplets of black ink per dot | Color mixing | Test 4 | Test 5 | Test 6 |
| --- | --- | --- | --- | --- | --- | --- | --- | --- |
| Ex. 11 | 3 | 0.045 | 0.08 | 0.04 µg × 2 | ⅔ | ○ | ○ | ○ |
| Ex. 12 | 4 | 0.045 | 0.06 | 0.015 µg × 4 | ½ | ◎ | ◎ | ○ |
| Ex. 13 | 3 | 0.045 | 0.09 | 0.045 µg × 2 | ⅓ | ○ | ○ | ○ |
| Ex. 14 | 4 | 0.045 | 0.10 | 0.05 µg × 2 | ⅔ | ○ | ○ | ○ |
| Ex. 15 | 3 | 0.06 | 0.08 | 0.02 µg × 4 | ½ | ◎ | ○ | ○ |
| Comp. Ex. 11 | 3 | 0.045 | 0.06 | 0.06 µg × 1 | ⅔ | △ | △ | x |
| Comp. Ex. 12 | 4 | 0.045 | 0.08 | 0.08 µg × 1 | ½ | △ | △ | x |
| Comp. Ex. 13 | 4 | 0.045 | 0.10 | 0.10 µg × 1 | ⅔ | x | x | △ |

Test 7: Color Mixing

The color print was conducted with the combination of the ink compositions shown in Table 2 on commercially available PPC paper (XEROX-P manufactured by Fuji Xerox Co., Ltd.). The amounts of inks per dot and number of ink droplets consisting of a black dot were as shown in Table 5. When a black image was formed adjacent to a color image, some black dots in the whole region of the black image were replaced with color dots. The ratio of the black dots thinned out to the total number of the black dots in the color mixing region was as shown in Table 5. The bleeding of the print sample was evaluated in the same manner as described in Test 1. The results are given in Table 5.

Test 8: Drying rate of prints

The drying rates of the prints provided in the same manner as described in Test 7 were measured in the same manner as described in Test 2. The results are given in Table 5.

TABLE 5

|  | Combination of inks | Weight of color ink per dot (µg) | Total weight of black ink per dot (µg) | Weight and number of ink droplets of black ink per dot | Color mixing | Test 7 | Test 8 |
| --- | --- | --- | --- | --- | --- | --- | --- |
| Ex. 21 | 3 | 0.045 | 0.08 | 0.04 µg × 2 | ¼ | ◯ | ◯ |
| Ex. 22 | 3 | 0.045 | 0.06 | 0.015 µg × 4 | ⅖ | ◎ | ◎ |
| Ex. 23 | 4 | 0.045 | 0.09 | 0.045 µg × 2 | ⅗ | ◯ | ◯ |
| Ex. 24 | 4 | 0.05 | 0.10 | 0.05 µg × 2 | ¼ | ◯ | ◯ |
| Ex. 25 | 4 | 0.06 | 0.08 | 0.02 µg × 4 | ⅖ | ◎ | ◯ |
| Comp. Ex. 21 | 3 | 0.045 | 0.06 | 0.06 µg × 1 | ¼ | Δ | Δ |
| Comp. Ex. 22 | 3 | 0.045 | 0.10 | 0.10 µg × 1 | ⅖ | x | x |
| Comp. Ex. 23 | 4 | 0.06 | 0.12 | 0.12 µg × 1 | ⅗ | x | x |

What is claimed is:

1. A color ink jet recording method using a color ink and a black ink, comprising the steps of printing black dots with black ink droplets in a unit area, printing color dots with color ink droplets in a unit area, providing two or more black ink droplets per unit area with respect to a same size unit area which is formed by one color ink droplet, and wherein the color ink has a surface tension of less than 40 dyn/cm at 20° C. and the black ink has a surface tension of not less than 40 dyn/cm.

2. The color ink jet recording method according to claim 1, wherein the color ink is yellow, magenta or cyan.

3. The color ink jet recording method according to claim 1, wherein one black dot unit consists of 2 to 4 black ink droplets.

4. The color ink jet recording method according to claim 1, wherein, when a black image is adjacent to a color image, the method further comprises the step of printing the color ink as an undercoat on positions of some black dots in the whole region or a partial region of the black image.

5. The color ink jet recording method according to claim 4, wherein the undercoat of the color ink is formed to prevent bleeding derived from color-to-color intermixing caused by a dot flowing into adjacent dots or an ink in an image region flowing into adjacent image regions.

6. The color ink jet recording method according to claim 4, wherein the partial region of the black image is not exceeding 10-dot width from a border of the black image facing the color image.

7. The color ink jet recording method according to claim 4, wherein the black image is located apart from the color image at a distance of an empty dot or dots.

8. The color ink jet recording method according to claim 7, wherein the distance is not exceeding 10 dots.

9. The color ink jet recording method according to any one of claims 4 to 8, wherein the black dots under which the color ink is printed are in a ratio of 10 to 100% of the black dots in the region.

10. The color ink jet recording method according to claim 1, wherein, when a black image is adjacent to a color image, the step of printing the black dots is suspended to form some non-printed dots in the whole or a partial region of the black image, and the method further comprises a step of printing a color ink on the non-printed dots.

11. The color ink jet recording method according to claim 10, wherein the suspension of the step of printing the black dots, and the step of printing the color ink on the non-printed dots are conducted to prevent bleeding derived from color-to-color intermixing caused by a dot flowing into adjacent dots or an ink in an image region flowing into adjacent image regions.

12. The color ink jet recording method according to claim 11, wherein the partial region of the black image is not exceeding 10-dot width from a border of the black image facing the color image.

13. The color ink jet recording method according to claim 11, wherein the black image is located apart from the color image at a distance of an empty dot or dots.

14. The color ink jet recording method according to claim 13, wherein the distance is not exceeding 10 dots.

15. The color ink jet recording method according to any one of claims 12 to 14, or 11, wherein the black dots are thinned out at a ratio of 10 to 80% of the dots in the region.

* * * * *